United States Patent Office 3,150,978
Patented Sept. 29, 1964

3,150,978
PROCESS FOR MAKING A PUFFABLE
HALF PRODUCT
Wayne W. Campfield, Battle Creek, Mich., assignor to General Foods Corporation, White Plains, N.Y., a corporation of Delaware
No Drawing. Continuation of application Ser. No. 51,768, Aug. 25, 1960. This application Jan. 24, 1963, Ser. No. 253,734
7 Claims. (Cl. 99—1)

This invention relates to puffed edible snacks. More particularly, the invention is concerned with an improved process for the production of a puffable "half product," that is, a product which upon immersion in hot frying oil rapidly expands into a vesicular low density product.

Heretofore half products have been produced from tubers (typically potato and tapioca) by gelatinization of the starch in a moist mash or dough, shaping of the gelatinized starch-containing body, and drying of that body to a horny consistency. This procedure has been used traditionally by Orientals to make half products from cassava, the half product being notable for its almost indefinite storage-life.

The production of a half product of the aforestated type from non-tuberous starches has been less common and representative of half products of commerce are those produced by the processes described in U.S. Patent No. 2,665,208, dated January 5, 1954, and U.S. Patent No. 2,863,770, dated December 9, 1958. These patents describe improvements in the art of making a half product by employing starch-containing material in a more or less farinaceous condition. In the case of the former patent, the patentee discloses the addition of a starchy material to a cooked potato mash whereafter the mash is converted into a dried densified mass which expands upon immersion in hot oil. The latter process represents an improvement in that it produces from a moistened and preswelled tuberous starch powder, which is extruded under high extrusion pressure, a coherent band which when dried puffs upon immersion in hot oil.

All of these processes require a number of operations wherein the starting material is either blended with other previously treated starchy material or is itself gelatinized prior to formation of a compressed dough shape which is ultimately converted into the half product upon drying. It would be desirable for manufacturing economy and ease to provide a process which combines the required cooking and shaping operations into one manufacturing step, involving the use of one piece of equipment to which raw, starchy material of commerce, in either a farinaceous or a whole state, is introduced and wherefrom a dough mass will issue in a condition wherein it is readily converted to half-product form. The ideal process, therefore, would call for the simultaneous gelatinization and compression of the raw starchy material to an extrudate having the desired properties required for a half product, i.e., rapid expansion in hot oil to a low density, vesicular snack.

In accordance with the present invention, the raw starch-containing material, typically corn grits or corn flour, but including any starchy composition such as potato, tapioca, wheat, rice, sorghum, oat, and the like, is introduced to a simultaneous cooking and kneading operation wherein the starch composition is cooked to the extent of swelling of starch granules, and wherein the thus-treated starchy material is directly transferred to an extrusion chamber under such high pressures as will result in some rupture of starch cells. Such extrusion pressures generally are of a magnitude whereat the extrudate would itself expand upon emergence to normal atmospheric conditions. Such expansion is to be avoided, however, and the treated dough mass transferred to the point of extrusion is instead cooled whereby the normal tendency of the starchy dough to expand is curtailed, the extrudate issuing in a compacted densified condition having a moisture content in the neighborhood of 15–35%, depending upon the lubricity or working characteristics of the farinaceous mass.

Upon issuance of this mass from the extrusion head is then dried to a moisture content of less than 12%, which drying may be preceded by an intermediate shaping or cutting or a combination of shaping and cutting to effect the desired half-product configuration.

The equipment employed to carry out the process essentially comprises a rotor and a stator, the rotor or the stator, or both, being heated by steam or other means, and the rotor being provided in the form of a screw with flights which progressively build up pressure and temperature as the mixture of raw starch and water (15–35%) is advanced within the chamber. Generally, the cooking operation is carried out in such a manner that gelatinization of the raw starch results from a combination of heat from the rotor and/or the stator, as well as the heat generated by friction between the particles of the starchy material and the surfaces of the material-contacting elements of the rotor and the stator.

As the moist starch-bearing material is advanced between the rotor and the stator, the temperature of the moist starchy mass is elevated to a point above that at which the moisture would ordinarily vaporize at ordinary atmospheric pressure, i.e., 212° F., causing the material being extruded to issue in a porous cellulose spongy structure. In the present process, however, the material in this condition issues instead directly into a tempering zone wherein the material is maintained under pressure but cooled to a temperature below that at which the cooked dough will not subsequently expand upon issuance from the extrusion terminal of the chamber. Tempering can be carried out in a number of devices, in all of which the material is confined and cooled either by the overt addition of a cooling fluid around the tempering zone or by allowing the material to cool as it travels in a suitably elongated chamber. The tempering zone can be more compact and efficient if a cooling medium can be circulated around the tempering chamber and, therefore, it is the preferred practice to employ a cooling screw or auger as a rotor within a water-jacketed stator, whereby the temperature of the cooked dough is rapidly reduced to a temperature well below 212° F. prior to introduction to normal atmospheric pressure. Preferably, when the cooked farinaceous material has traversed through the tempering zone, it is cooled to a temperature of between 160°–200° F., so that it can be readily extruded through a suitable orifice which may be round, square, polygonal, rectangular, ribbed or of any other desired shape and can be readily cut into distinct pellets or slices by such means as a rotating knife at the orifices.

The pellets or slices thus produced have a density approaching that of the native raw material and, in any event, have a density greater than that of water. The extrudates have a moisture content approaching the original moisture content of the starch-bearing material in association with the water processed therewith, though the moisture level will be slightly lower. Usually these extrudates will have a moisture content in the order of 15–26% by weight, the moisture being uniformly distributed throughout.

The extrudate may be cut to any desired form, as indicated above, whereafter it is dried to a tough, horny mass having a moisture content whereat the product will puff upon immersion in hot frying oil. Usually it has been found that a moisture content below 12% is required in order that an adequately uniform expansion into a vesicular structure is achieved. This drying may be carried out by any suitable means, such as by the use of a hot drying gas, or the extrudate may be allowed to dry as a matter of course to the desired moisture content. At moisture levels above 12%, the half product produced does not expand adequately upon immersion in hot frying oil, whereas at too low a moisture content (say below 5%) insufficient moisture is present to provide a puff.

This invention will now be more fully illustrated in the following example.

A corn snack was produced by the following method:

(1) A raw corn flour dough of the following composition was prepared in a ribbon mixer—

| | Percent |
|---|---|
| Ungelatinized corn flour (containing about 12% moisture) | 81.5 |
| Water | 16.5 |
| Salt | 2.0 |
| | 100.0 |

(2) The corn dough was passed through a Baker-Perkins Ko-Kneader. This piece of equipment is a kneading extruder wherein the rotor or screw has interrupted threads or flights located within a complementary cylindrical jacket or barrel. The jacket preferably has a plurality of rows of spaced teeth projecting inwardly therefrom. The screw is both rotated and reciprocated within the jacket or barrel so that the stationary teeth of the barrel pass through the interruptions in the thread of the screw, as a result of which some of the corn dough is held back by each of the fixed teeth temporarily as the kneaded mixture is cooked and passes in the direction of the terminal of the chamber. In this way the material is conveyed through the mechanical extruder in loops and is highly mixed while having a maximum opportunity to generate friction in movement against the mechanical elements of the extruder, as well as to absorb heat therefrom, which heat is supplied by surrounding or jacketing the barrel with steam at a temperature of 250° F. Steam of 200° F. may also be introduced concurrently with the introduction of the moist dough to provide more effective gelatinization. The screw is internally heated by steam at a temperature of 270° F. A tempering head is provided at the extrusion end of the Ko-Kneader and cold tap water (60° F.) is circulated through the tempering head in order to prevent expansion of the cooked dough upon its issuance from the cooker to the atmosphere.

(3) The gelatinized dough issuing from the extruder was in the form of a densified coherent band. A cut-off knife located proximate the point of issuance from the extruder was run fast enough to produce thin, wafer-like discs having a thickness in the neighborhood of 1/32″. These discs were at a moisture content in the neighborhood of about 23% and were allowed to dry in air to a final moisture of 9%.

(4) The dried discs were fried in a deep fat fryer having an oil temperature of 400° F. Upon introduction of the discs to the fryer they sink to the bottom of the oil and in 5 to 10 seconds puff and rise to the surface of the oil to form a snack having a light vesicular crisp texture and a pleasant flavor.

Although the present invention has been illustrated by a specific example of one type of raw starchy material, namely, corn flour, other raw materials may be employed to equal advantage. Thus, any tuberous or non-tuberous starchy material in the raw form may be admixed with sufficient moisture to effect gelatinization in the manner of the present invention. Advantageously, the raw starchy material can be converted in a single operation into a densified, coherent band of gelatinized starchy material, which transformation occurs in a relatively rapid fashion, providing a high yield of extrudate in a form wherein it is readily convertible by drying to a half product. This high yield and production speed is made possible by carrying out a relatively rapid cooking operation, followed in turn by a tempering operation which offsets the tendency of the moist kneaded dough mass to puff upon issuance to a normal atmospheric pressure. It is a material feature of the present invention, therefore, that the dough mass be cooled to a temperature well below 212° F. prior to emergence as a band for drying to a half product.

This application is a continuation of co-pending application Serial No. 51,768, filed August 25, 1960, now abandoned.

While the present invention has been described with particular reference to a specific example, it is not to be limited thereby, but reference is to be had to the appended claims for a definition of its scope.

What is claimed is:

1. A process for making a puffable half product which comprises compounding a moist, starch-containing, uncooked dough having a moisture content of about 15–35%; passing said dough between relatively moving proximately spaced surfaces which generate a high temperature and rupture starch granules in said dough to produce a cooked product wherein the moisture present tends to vaporize and expand the dough; tempering said cooked dough by confining and cooling said dough to a temperature below 212° F. until it is ready to issue in a condition whereat it will not expand when it is released to an unconfined area at normal atmospheric pressure; issuing the tempered cooked dough to normal atmospheric pressure in the form of a coherent band; subdividing said coherent band into pieces of a desired shape; and drying the dough pieces to a moisture content of about 5–12%.

2. The process of claim 1 wherein the cooked dough passes directly from the zone for cooking the dough to the zone for tempering the dough.

3. The process of claim 2 wherein the cooked dough is formed into the shape desired as it passes from the cooking zone to the tempering zone.

4. The process of claim 3 wherein tempering is effected by allowing the material to cool as it travels in heat exchange relationship with a cooling fluid.

5. The process of claim 4 wherein the cooked dough is cooled to a temperature within the range of 160°–200° F. during the tempering step.

6. The process of claim 1 wherein the tempered cooked dough issues at a density approaching that of the native raw material and at a density greater than that of water, and wherein the extrudate has a moisture content approaching the original moisture content of said moist, starch-containing, uncooked dough.

7. The process of claim 6 wherein the extrudate has a moisture content within the range of 15–26% by weight and wherein the cooked dough in the tempering zone has 15–26% by weight moisture.

References Cited in the file of this patent

UNITED STATES PATENTS 2,665,208     Spieser     Jan. 5, 1954